United States Patent
Sanden et al.

(10) Patent No.: US 10,126,193 B2
(45) Date of Patent: Nov. 13, 2018

(54) COMPACT OR MINIATURE HIGH TEMPERATURE DIFFERENTIAL PRESSURE SENSOR CAPSULE

(71) Applicant: Rosemount Aerospace Inc., Burnsville, MN (US)

(72) Inventors: Christopher Sanden, Bloomington, MN (US); Odd Harald Steen Eriksen, Minneapolis, MN (US)

(73) Assignee: Rosemount Aerospace Inc., Burnsville, MN (US)

(*) Notice: Subject to any disclaimer, the term of this patent is extended or adjusted under 35 U.S.C. 154(b) by 127 days.

(21) Appl. No.: 15/000,676

(22) Filed: Jan. 19, 2016

(65) Prior Publication Data
US 2017/0205303 A1    Jul. 20, 2017

(51) Int. Cl.
| | |
|---|---|
| G01L 13/06 | (2006.01) |
| G01L 13/02 | (2006.01) |
| G01L 19/00 | (2006.01) |
| G01L 19/04 | (2006.01) |

(52) U.S. Cl.
CPC ......... *G01L 13/06* (2013.01); *G01L 13/026* (2013.01); *G01L 19/0046* (2013.01); *G01L 19/0084* (2013.01); *G01L 19/04* (2013.01)

(58) Field of Classification Search
None
See application file for complete search history.

(56) References Cited

U.S. PATENT DOCUMENTS

| | | | |
|---|---|---|---|
| 5,220,837 A * | 6/1993 | Silverwater | G01L 19/0618 |
| | | | 137/557 |
| 6,918,303 B2 | 7/2005 | Casimiro et al. | |
| 7,437,939 B1 | 10/2008 | Chakraborty et al. | |
| 7,624,642 B2 | 12/2009 | Romo | |
| 8,371,175 B2 | 2/2013 | Romo | |
| 2009/0078054 A1 * | 3/2009 | Romo | G01L 19/04 |
| | | | 73/717 |
| 2015/0247774 A1 | 9/2015 | Wagner et al. | |

FOREIGN PATENT DOCUMENTS

| | | |
|---|---|---|
| DE | 4308718 A1 | 9/1994 |
| EP | 2899524 A1 | 7/2015 |
| WO | 8201250 A1 | 4/1982 |
| WO | 2015162113 A1 | 10/2015 |

OTHER PUBLICATIONS

Extended European Search Report, for European Patent Application No. 17151684.2, dated Jun. 1, 2017, 11 pages.

* cited by examiner

*Primary Examiner* — Andre J Allen
(74) *Attorney, Agent, or Firm* — Kinney & Lange, P.A.

(57) ABSTRACT

A differential pressure sensor includes a body having a first end, a second end, and a wall. The first end and second end include isolator diaphragms connected to external first and second process fluid inlets. A MEMS pressure sensor including a pressure sensing diaphragm inside the cylinder has first and second sides coupled to the first and second isolator diaphragms by first and second fill fluid volumes. Sensor elements on the diaphragm are configured to provide, via associated sensor circuitry, an indication of deflection due to pressure differences between the first and second fill volumes. Electrical and fill fluid connections to the differential pressure sensor are made through radial connections in the wall of the body.

17 Claims, 3 Drawing Sheets

COMPACT OR MINIATURE HIGH TEMPERATURE DIFFERENTIAL PRESSURE SENSOR CAPSULE

BACKGROUND

This invention relates to pressure sensors. In particular this invention relates to robust, extremely compact differential pressure sensors.

Pressure transmitters are commonly used in industrial processes to measure and monitor pressures of various industrial process fluids such as vapors and gasses of engines and other power sources. Differential pressure transmitters generally include a pair of process fluid inputs which are coupled to a differential pressure sensor in the transmitter that responds to a difference in pressure between the two inputs. Differential pressure transmitters typically include a differential pressure sensor coupled to a pair of isolator diaphragms. The isolator diaphragms are positioned at the process fluid inlets and isolate the differential pressure sensor from process fluids being sensed. Pressure is transferred from the process fluid to the differential pressure sensor through a thermally stable fill fluid in a passageway extending from the isolator diaphragms to the differential pressure sensor.

There is a need for a compact differential pressure sensor in a small package with a MEMS sensing element that is stable over a range of operating temperatures.

SUMMARY

A differential pressure sensor includes a body having a first end, a second end, and a wall. The first and second ends include isolator diaphragms connected to external first and second process fluid inlets. A MEMS pressure sensor including a pressure sensing diaphragm inside the cylinder has first and second sides coupled to the first and second isolator diaphragms by first and second fill fluid volumes. Sensor elements on the diaphragm are configured to provide, via associated sensor circuitry, an indication of deflection due to pressure differences between the first and second fill volumes. Electrical and fill fluid connections to the differential pressure sensor are through radial connections in the cylinder wall.

DETAILED DESCRIPTION

Figure 1:
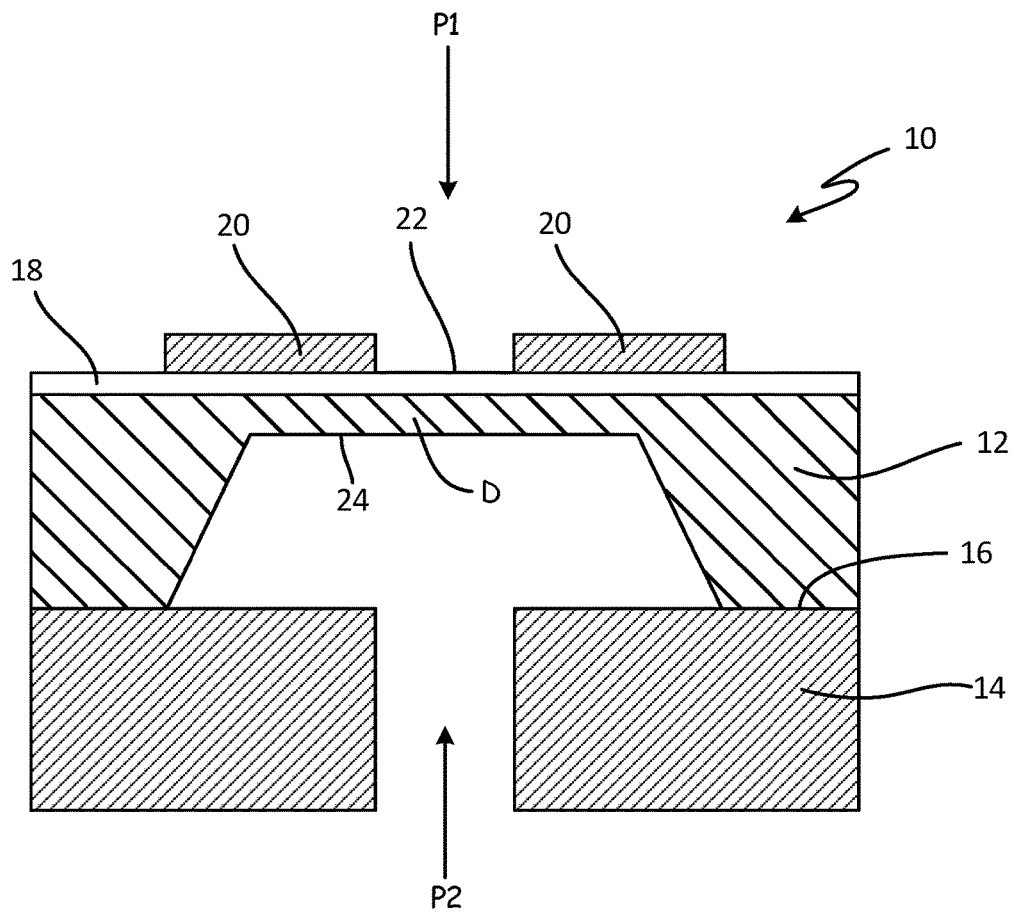
FIG. 1 is a cross-section of a MEMS pressure sensor for use in embodiments of the invention.

A cross-section of a microelectromechanical system (MEMS) pressure sensor is shown in FIG. 1. Pressure sensor 10 may comprise a single crystal silicon wafer 12 secured to silicon backing wafer 14 along bond line 16. The cavity in wafer 12 may form diaphragm D with bottom surface 24. Dielectric coating 18 and sensing elements 20 with associated circuitry (not shown) on top surface 22 of diaphragm D may detect deflection of diaphragm D due to a pressure P thereby indicating and measuring a pressure change. Sensing elements 20 may be piezoelectric, piezoresistive or other sensing means known in the art. MEMS pressure sensor 10 of FIG. 1 may be the pressure sensor used in embodiments of the differential pressure sensor under pressures P1 and P2 shown in FIGS. 2 and 3 and described below.

Figure 2:
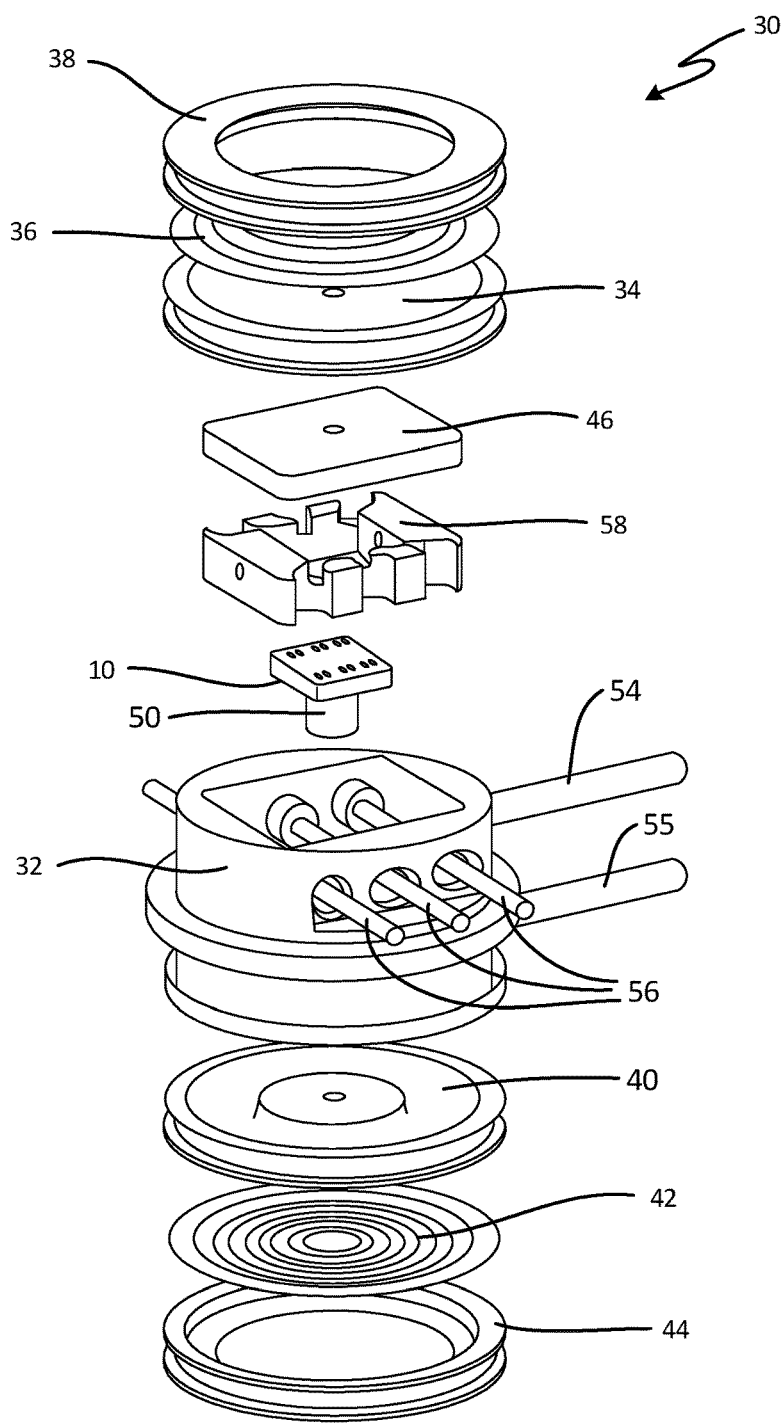
FIG. 2 is an exploded view of a differential pressure sensor according to an embodiment of the invention.

FIG. 2 is an exploded view of differential pressure sensing capsule 30 according to an embodiment of the invention. Capsule 30 has a compact cylindrical body with metal isolation diaphragms 36 and 42 on each end of the capsule. Capsule 30 may be a compact package with fill fluid connections 54 and 55 and electrical connections 56 exiting the capsule in radial directions, thereby adding to the compactness of the device. External components of capsule 30 may include header 32, upper and lower isolator plates 34 and 40, upper and lower isolator diaphragms 36 and 42 and upper and lower weld rings 38 and 44 all formed from stainless steel. The terms upper and lower refer to respective upper and lower elements as oriented and shown in FIGS. 1-3. Internal components of capsule 30 may include MEMS pressure sensor 10 (for example, as described above with respect to FIG. 1), ULTEM amorphous thermoplastic polyetherimid (PEI) resin spacer 46, ULTEM chamber 58, upper Pyrex pedestal 50, and lower Kovar pedestal 52 (shown in FIG. 3). Fill fluid connections 54 and 55 may be nickel or nickel alloy tubes brazed to stainless steel header 32. Electrical connections 56 may be gold plated Inconel wires in a glass ceramic seal. Although FIG. 2 shows a cylindrical capsule, the shape may have any form including square, hexagonal, or others that fit the needs of the system, including custom shapes that are not necessarily regular polygons.

Figure 3:
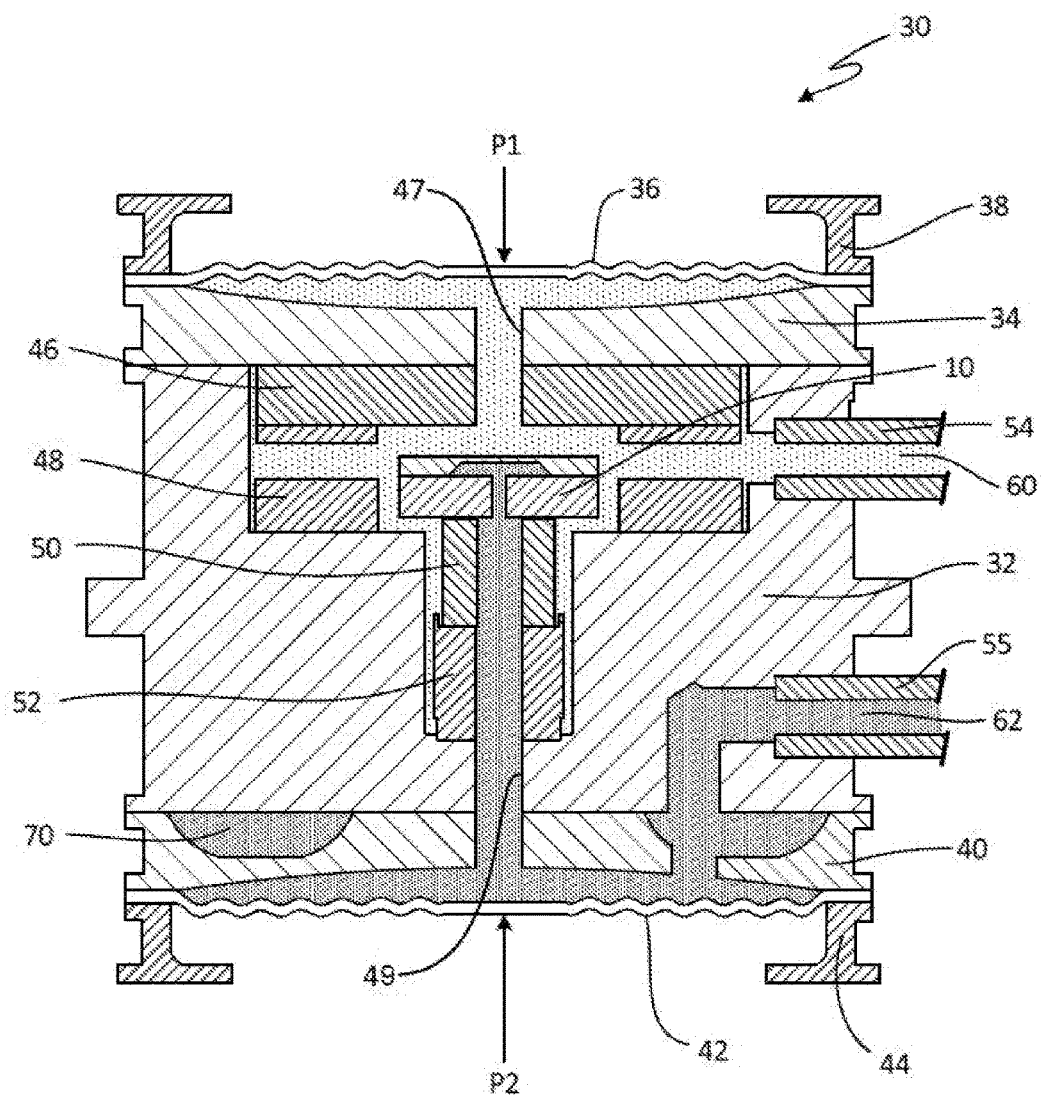
FIG. 3 is a cross-section of a differential pressure sensor according to an embodiment of the invention.

A cross-section of differential pressure sensing capsule 30 is shown in FIG. 3. All metal components are 316 L stainless steel in an exemplary embodiment. All the external joints in the capsule may be joined by TIG welds. Sensor 10 may be mounted on a two-part, thermally stable pedestal comprising upper Pyrex pedestal 50 on lower Kovar pedestal 52. Sensor 10 may be attached to upper Pyrex pedestal 50 by anodic bonding. Anodic bonding is the process of applying a pressure to the joint and applying an electric field across the joint at an elevated temperature to assist ionic diffusion to form a bond. Upper Pyrex pedestal 50 may be attached to lower Kovar pedestal 52 by brazing. Lower Kovar pedestal 52 may be attached to header 32 by brazing.

The coefficients of thermal expansion (CTE) of the internal components may be designed to minimize their dimensional change during a change in temperature and to minimize the joint integrity where lower Kovar pedestal 52 is joined to header 32. The CTEs of silicon, Pyrex, Kovar, and 316 L stainless steel are $3\times10^{-6}$ m/m° K, $4\times10^{-6}$ m/m° K, $5.1\times10^{-6}$ m/m° K and $16\times10^{-6}$ m/m° K respectively. The low CTE of the overall sensor stack minimizes the volume change of interior components in the fill fluid volume during temperature excursions, thereby increasing the accuracy of the differential pressure measurements. Although the above-mentioned materials are used in the described embodiment of the invention, other materials that offer an acceptable internal volume change during temperature excursions may also be contemplated for the present invention providing they have similar CTEs.

First and second fill fluids 60 and 62 are indicated in FIG. 3 by dark shading. After capsule 30 is filled with first and second fill fluids 60 and 62 through nickel or nickel alloy fill tubes 54 and 55, nickel or nickel alloy fill tubes 54 and 55 may be crimped and spot welded to seal the fluid chambers as indicated by "I" in FIG. 3. Process fluid pressure P1 may deflect upper isolator diaphragm 36 which raises pressure in first fill fluid 60 under upper isolator diaphragm 36. First fill fluid 60 is fluidly connected to top surface 22 (FIG. 1) of sensor 10 which causes diaphragm D (FIG. 1) of sensor 10 to deflect, thereby generating a signal from sensors 20 (FIG. 1).

Process fluid pressure P2 may deflect lower isolator diaphragm 42 which raises pressure in second fill fluid 62 behind lower isolator diaphragm 42. Upper central axial passage 47 extends through upper isolator plate 34 and through resin spacer 46. Lower central axial passage 49 extends through lower isolator plate 40, header 32, and pedestal 50. As shown in FIG. 3, upper central axial passage 47 and lower central axial passage 49 are coaxially aligned. Lower isolator Isolator diaphragm 42 is fluidly connected to bottom surface 24 (FIG. 1) of sensor 10 which causes diaphragm D (FIG. 1) to deflect depending on the difference in pressures P1 and P2, thereby generating a signal from sensors 20 (FIG. 1). In the embodiment shown and described, the volumes of first and second fill fluids 60 and 62 are equally matched. A circular depression in lower isolator plate 40 creates fluid chamber 70 that may be designed to allow the volume of second fill fluid 62 fluidly connected to bottom surface 24 (FIG. 1) of sensor 10 to match the volume of first fill fluid 60 fluidly connected to top surface 22 (FIG. 1) of sensor 10, thereby minimizing any error in thermally induced pressure in first and second fill fluids 60 and 62.

Fill fluids used in differential pressure sensor 30 are thermally stable fluids with low CTE values. In an embodiment a fill fluid may be an oxidative and thermally stable fluid, such as DURATHERM with a CTE of 0.1011%/° C.

Notable features of the sensor capsule disclosed herein include compact size, a relatively broad operating temperature range, and a robust design. In an exemplary embodiment, the diameter and height of the sensing capsule are from about 10.2 mm to about 17.8 mm. In an exemplary embodiment, the operating temperature is from about −55° C. to 225° C. In other embodiments, higher operating pressures may be achieved by different diaphragm thicknesses and the maximum operating pressure is about 13.8 MPa. In addition, there are no moving parts, resulting in excellent robustness.

Discussion of Possible Embodiments

The following are non-exclusive descriptions of possible embodiments of the present invention.

A differential pressure sensor may include: a body with a first end, a second end, and a wall, wherein the first end and the second end are isolator diaphragms connected to first and second process fluid inlets; a MEMS pressure sensor with a pressure sensing diaphragm inside the cylinder with first and second sides coupled to the first and second isolator diaphragms via first and second fill fluid volumes; and sensor elements on the diaphragm that provide, with associated sensor circuitry, an indication of deflection of the diaphragm as a result of pressure differences between the first and second process fluid volumes, and electrical connections and fill fluid connections to the pressure sensor through radial connections in the wall of the body.

The sensor of the preceding paragraph can optionally include, additionally and/or alternatively any, one or more of the following features, configurations and/or additional components:

The first and second fill fluid volumes may be low coefficient of thermal expansion (CTE) fluids.

The structural material surrounding the fill fluid volumes and the MEMS pressure sensor may be low CTE materials.

The low CTE materials surrounding the sensor may be ULTEM material.

The MEMS pressure sensor may be mounted on a pedestal that includes a low CTE Kovar pedestal and a Pyrex pedestal.

The operating temperature of the differential pressure sensor may be from about −55° C. to about 225° C.

The diameter of the differential pressure sensor may be from about 10.2 mm to about 17.8 mm.

The height of the sensor may be from about 10.2 mm to about 17.8 mm.

The body of the sensor may be stainless steel.

The electrical connections may be gold plated Inconel pins in a glass ceramic seal.

The first and second fill fluid volumes may be matched.

A differential pressure sensor may include: a cylindrical metal body with opposing first and second ends, where the first and second ends may be first and second metal isolator diaphragms connected to external first and second process fluid inlets; a MEMS pressure sensor with a diaphragm with first and second sides mounted in a chamber inside the cylindrical metal body on a pedestal where the first side of the diaphragm may be fluidly coupled to the first metal isolator diaphragm and the second side of the diaphragm may be fluidly coupled to the second isolator diaphragm through a hole in the pedestal; and sensor elements on the diaphragm that provide, with associated sensor circuitry, an indication of pressure differences in fill fluids on each side of the diaphragm where electrical connections and fill fluid connections to the sensor are made through a side of the body perpendicular to a normal direction between the opposing first and second metal isolator diaphragms.

The sensor of the preceding paragraph can optionally include, additionally and/or alternatively any, one or more of the following features, configurations and/or additional components:

The volumes of the fill fluids coupled to each side of the pressure sensing diaphragm may be matched.

The walls of the chamber and the pedestal may be low CTE materials.

The pedestal may be Kovar and Pyrex.

The fill fluids may be low CTE fluids.

All metal components may be stainless steel.

The operating temperature of the sensor may be from about −55° C. to about 225° C.

The maximum operating pressure of the differential pressure sensor may be about 13.8 MPa.

The cylindrical metal body may have a cross-sectional shape that is round, square, or hexagonal.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A differential pressure sensor comprising:
a header with an upper end, a lower end, a side wall, and an interior cavity including an upper cavity portion and a lower cavity portion;

a pedestal attached to a bottom of the lower cavity portion and extending into the upper cavity portion;

a MEMS pressure sensor mounted to an upper end of the pedestal and positioned in the upper cavity portion, the MEMS pressure sensor including a sensor diaphragm containing sensor elements and having a top surface and a bottom surface;

a chamber positioned in the upper cavity portion and surrounding the MEMS pressure sensor;

a spacer positioned on the chamber and within the upper cavity portion;

an upper isolator plate mounted on the upper end of the header;

an upper isolator diaphragm mounted on the upper isolator plate;

a lower isolator plate mounted on the lower end of the header;

a lower isolator diaphragm mounted on the lower isolator plate;

an upper central axial passage through the upper isolator plate and the spacer; and a lower central axial passage through the lower isolator plate, the header, and the pedestal to define a fluid connection between the lower isolator diaphragm and the bottom surface of the sensor diaphragm; wherein the upper and lower central axial passages are coaxially aligned.

2. The differential pressure sensor of claim 1, wherein the lower isolator plate and the lower end of the header form a fluid chamber that is fluidly connected to the lower isolator diaphragm and to the bottom surface of the sensor diaphragm.

3. The differential pressure sensor of claim 1, and further comprising:

an upper weld ring mounted to the upper isolator diaphragm; and a lower weld ring mounted to the lower isolator diaphragm.

4. The differential pressure sensor of claim 1, wherein a first fill fluid that contacts the upper isolator diaphragm, and a second fill fluid that contacts the lower isolator diaphragm have coefficients of thermal expansion (CTE) that are less than or equal to 0.1011%/C°.

5. The differential pressure sensor of claim 1, wherein the pedestal comprises a lower pedestal and an upper pedestal.

6. The differential pressure sensor of claim 5, wherein the upper pedestal has a CTE of $4 \times 10^{-6}$ m/m° K and the lower pedestal has a CTE of $5.1 \times 10^{-6}$ m/m° K.

7. The differential pressure sensor of claim 1, wherein the chamber and the spacer are formed of polymeric material.

8. The differential pressure sensor of claim 7, wherein the chamber and spacer are formed of polyetherimide material.

9. The differential pressure sensor of claim 1, wherein the differential pressure sensor is operable over an operating temperature range of about −55° C. to about 225° C.

10. The differential pressure sensor of claim 1, wherein an outer diameter of the differential pressure sensor is from about 10.2 mm to about 17.8 mm.

11. The differential pressure sensor of claim 1, wherein a height of the differential pressure sensor is from about 10.2 mm to about 17.8 mm.

12. The differential pressure sensor of claim 1, wherein the header is formed of stainless steel.

13. The differential pressure sensor of claim 1, wherein electrical connections to the MEMS pressure sensor comprise gold plated pins in a glass ceramic seal.

14. The differential pressure sensor of claim 1, wherein a volume of a first fill fluid that is in contact with the upper isolator diaphragm and the upper surface of the sensor diaphragm is equal to a volume of a second fill fluid that is in contact with the lower isolator diaphragm and the bottom surface of the sensor diaphragm.

15. The differential pressure sensor of claim 1, wherein the header, the upper isolator plate, and the lower isolator plate are made of stainless steel.

16. The differential pressure sensor of claim 1, wherein the differential pressure sensor has a maximum operating pressure of about 13.8 MPa.

17. The differential pressure sensor of claim 1, wherein the header has a cylindrical shape with a cross-section that is round, square, or hexagonal.

* * * * *